(12) United States Patent
Park

(10) Patent No.: US 10,891,236 B2
(45) Date of Patent: Jan. 12, 2021

(54) DATA STORAGE DEVICE AND OPERATING METHOD THEREOF

(71) Applicant: SK hynix Inc., Gyeonggi-do (KR)

(72) Inventor: Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 109 days.

(21) Appl. No.: 15/703,090

(22) Filed: Sep. 13, 2017

(65) Prior Publication Data

US 2018/0314643 A1 Nov. 1, 2018

(30) Foreign Application Priority Data

Apr. 28, 2017 (KR) .................. 10-2017-0055583

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1032* (2013.01); *G06F 2212/202* (2013.01); *G06F 2212/657* (2013.01); *G06F 2212/7201* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 17/00–5095; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 15/00–06; G11C 16/00–3495; G11C 17/00–18; G11C 2216/00–30

See application file for complete search history.

(56) References Cited

U.S. PATENT DOCUMENTS

| | | | | |
|---|---|---|---|---|
| 5,802,552 A | * | 9/1998 | Fandrich | G06F 12/0638 710/52 |
| 6,757,806 B2 | * | 6/2004 | Shim | G06F 1/3203 711/203 |
| 9,727,570 B2 | * | 8/2017 | Post | G06F 3/0608 |
| 9,880,770 B2 | * | 1/2018 | Zhang | G06F 3/0619 |
| 10,198,207 B2 | * | 2/2019 | Lee | G06F 3/061 |
| 10,339,046 B1 | * | 7/2019 | Hsieh | G06F 3/0656 |
| 10,466,905 B2 | * | 11/2019 | Lee | G06F 3/0679 |
| 10,489,290 B2 | * | 11/2019 | Kim | G06F 12/0246 |
| 10,606,761 B2 | * | 3/2020 | Lee | G06F 12/0246 |
| 10,698,809 B2 | * | 6/2020 | Lee | G06F 12/1009 |

(Continued)

*Primary Examiner* — Daniel C. Chappell
(74) *Attorney, Agent, or Firm* — IP & T Group LLP

(57) ABSTRACT

A method for operating a data storage device which uses a nonvolatile memory device including a buffer memory block which temporarily stores data, as a storage medium, includes receiving an unmap request which requests that an unmap address be erased, from a host device; storing the unmap address and flag information indicating that the unmap address is unmapped, in a first empty page of the buffer memory block; and mapping the unmap address and flagging flag information indicating that the unmap address is unmapped, in a physical-to-logical (P2L) map corresponding to the first empty page of the buffer memory block.

20 Claims, 14 Drawing Sheets

(56) References Cited

U.S. PATENT DOCUMENTS

| | | | |
|---|---|---|---|
| 2012/0311298 A1* | 12/2012 | Post | G06F 3/0608 |
| | | | 711/202 |
| 2013/0151754 A1* | 6/2013 | Post | G06F 12/0246 |
| | | | 711/103 |
| 2014/0258675 A1* | 9/2014 | Takeuchi | G06F 3/0614 |
| | | | 711/206 |
| 2015/0149741 A1 | 5/2015 | Zhuo et al. | |
| 2017/0060768 A1* | 3/2017 | Zhang | G06F 3/0619 |
| 2017/0242785 A1* | 8/2017 | O'Krafka | G06F 12/0246 |
| 2017/0242790 A1* | 8/2017 | O'Krafka | G06F 3/0604 |
| 2017/0344478 A1* | 11/2017 | Feng | G06F 11/1474 |

\* cited by examiner

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0055583, filed on Apr. 28, 2017, which is herein incorporated by reference in its entirety.

BACKGROUND

1. Technical Field

Various embodiments generally relate to a data storage device which uses a nonvolatile memory device as a storage medium.

2. Related Art

Recently, the paradigm for the computer environment has changed into ubiquitous computing so that computer systems can be used anytime and anywhere. Due to this fact, the use of portable electronic devices such as mobile phones, digital cameras, and notebook computers has rapidly increased. In general, portable electronic devices use a data storage device which uses a memory device. A data storage device is used to store data which is used in a portable electronic device.

A data storage device using a memory device has excellent stability and durability because it does not include a mechanical driving unit. Also, a data storage device using a memory device is advantageous in that it may access data faster and consume less power. Non-limiting examples of a data storage device having such advantages include a universal serial bus (USB) memory device, memory cards having various interfaces, a universal flash storage (UFS) device, and a solid state drive (SSD).

SUMMARY

Various embodiments are directed to a data storage device capable of efficiently processing an unmap request of a host device, and an operating method thereof.

In an embodiment, a method for operating a data storage device which uses a nonvolatile memory device including a buffer memory block which temporarily stores data, may include: receiving an unmap request which requests that an unmap address be erased from a host device; storing the unmap address and flag information indicating that the unmap address is unmapped, in a first empty page of the buffer memory block; and mapping the unmap address and flagging flag information indicating that the unmap address is unmapped, in a physical-to-logical (P2L) map corresponding to the first empty page of the buffer memory block.

In an embodiment, a data storage device may include: a nonvolatile memory device including a buffer memory block which stores data temporarily; a random access memory suitable for storing a physical-to-logical (P2L) map which maps a physical address of the nonvolatile memory device and a logical address provided from a host device; and a control unit suitable for updating a logical-to-physical (L2P) map based on the P2L map, and flushing the L2P map in the nonvolatile memory device, wherein, according to an unmap request of the host device which requests that an unmap address be erased, the control unit stores the unmap address and flag information indicating that the unmap address is unmapped, in a first empty page of the buffer memory block, and maps the unmap address and flags flag information indicating that the unmap address is unmapped, in the P2L map corresponding to the first empty page of the buffer memory block in which the unmap address is stored.

According to the embodiments, the data storage device may efficiently process an unmap request of a host device, and stably store address mapping information.

DETAILED DESCRIPTION

Figure 1:
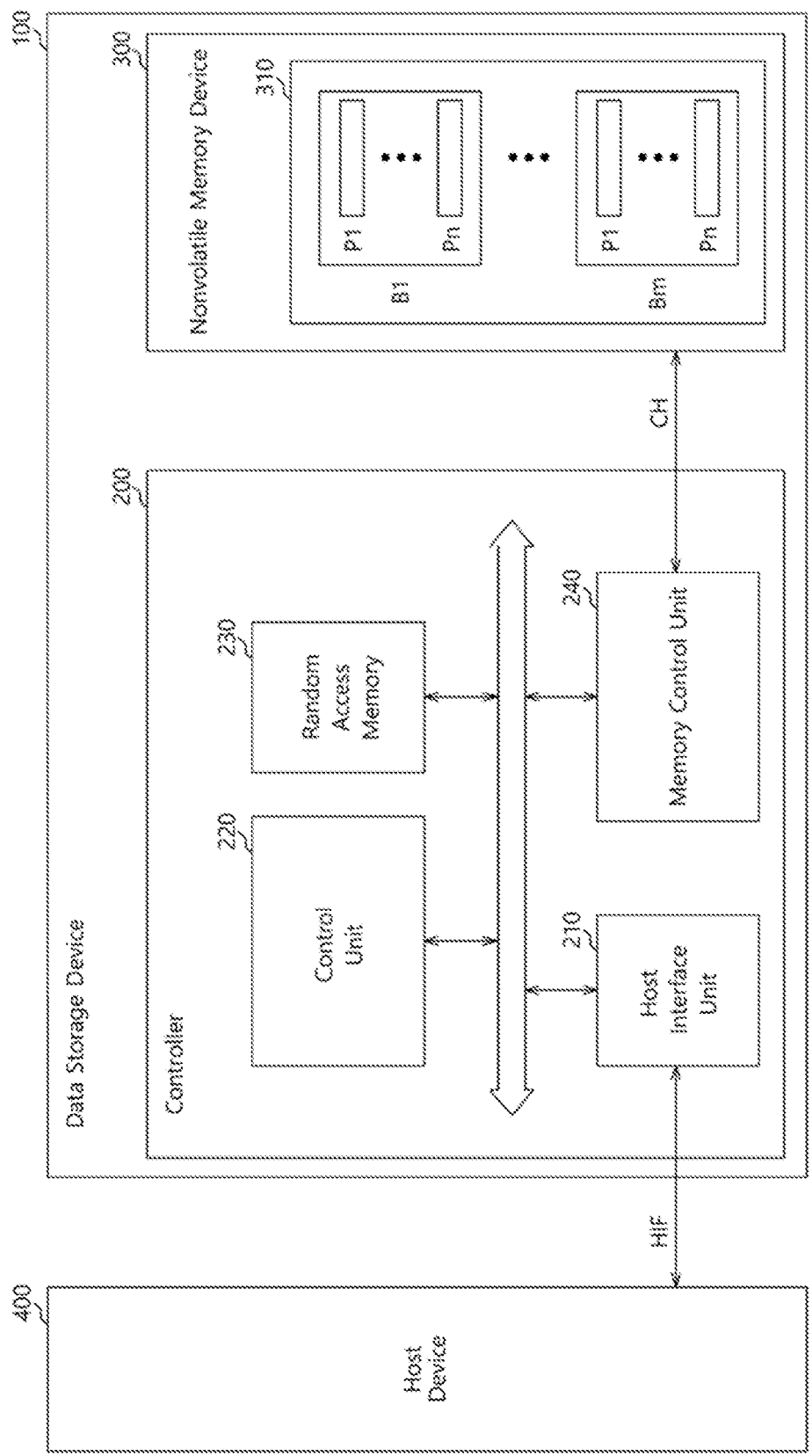
FIG. 1 is a block diagram illustrating a representation of an example of a data storage device in accordance with an embodiment.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof will be described below with reference to the accompanying drawings through various examples of embodiments.

FIG. 1 is a block diagram illustrating a representation of an example of a data storage device 100 in accordance with an embodiment. Referring to FIG. 1, the data storage device 100 may store data to be accessed by a host device 400 such as a mobile phone, an MP3 player, a laptop computer, a desktop computer, a game player, a television (TV), an in-vehicle infotainment system, and so forth. The data storage device 100 may be referred to as a memory system.

The data storage device 100 may be implemented with any one among various types of storage devices according to a host interface HIF meaning a transmission protocol with respect to the host device 400. For example, the data storage device 100 may be implemented with any one of various types of storage devices such as a solid state drive (SSD), a multimedia card such as an MMC, an eMMC, an RS-MMC and a micro-MMC, a secure digital card such as an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e) card type storage device, a compact flash (CF) card, a smart media card, a memory stick, and so forth.

The data storage device 100 may be implemented with any one among various types of package types. For example, the data storage device 100 may be manufactured as any one of various types of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200 and a nonvolatile memory device 300. The controller 200 may include a host interface unit 210, a control unit 220, a random access memory 230, and a memory control unit 240.

The host interface unit 210 may interface the host device 400 and the data storage device 100. For example, the host interface unit 210 may communicate with the host device 400 by using the host interface HIF, that is, any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e) protocols.

The control unit 220 may be configured by a micro control unit (MCU) or a central processing unit (CPU). The control unit 220 may process a request which is received from the host device 400. To process the request, the control unit 220 may drive an instruction or algorithm of a code type, that is, a software, loaded in the random access memory 230, and may control internal function blocks or the nonvolatile memory device 300.

The random access memory 230 may be configured by a random access memory such as a dynamic random access memory (DRAM) or a static random access memory (SRAM). The random access memory 230 may store software to be driven by the control unit 220. Further, the random access memory 230 may store data necessary for driving the software. That is, the random access memory 230 may operate as the working memory of the control unit 220.

The random access memory 230 may temporarily store data to be transmitted from the host device 400 to the nonvolatile memory device 300 or from the nonvolatile memory device 300 to the host device 400. That is, the random access memory 230 may operate as a data buffer memory or a data cache memory.

The memory control unit 240 may control the nonvolatile memory device 300 according to control of the control unit 220. The memory control unit 240 may also be referred to as a memory interface unit. The memory control unit 240 may provide control signals to the nonvolatile memory device 300. The control signals may include a command, an address, a control signal and so forth for controlling the nonvolatile memory device 300. The memory control unit 240 may provide data to the nonvolatile memory device 300 or may be provided with data from the nonvolatile memory device 300.

The nonvolatile memory device 300 may be coupled with the controller 200 through a channel CH which includes at least one signal line capable of transmitting a command, an address, control signals and data. The nonvolatile memory device 300 may be used as the storage medium of the data storage device 100.

The nonvolatile memory device 300 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RRAM or ReRAM) using a transition metal oxide.

The nonvolatile memory device 300 may include a memory cell region 310. From an operational viewpoint or a physical (or structural) viewpoint, the memory cells included in the memory cell region 310 may be configured into a hierarchical memory cell set or memory cell unit. For example, memory cells which are coupled to the same word line and are to be read and written or programmed simultaneously may be configured as a page P. In the following descriptions, memory cells configured as a page P will be referred to as a "page." Also, memory cells to be erased simultaneously may be configured as a memory block B. The memory cell region 310 may include a plurality of memory blocks B1 to Bm, and each of the memory blocks B1 to Bm may include a plurality of pages P1 to Pn.

The memory blocks B1 to Bm may be used as a buffer block and/or a data block by the control unit 220. The buffer block may be defined as a memory block which is used temporarily before data according to a write request of the host device 400 is written in the data block. The buffer block may be referred to as a log block or an open block. The data block may be defined as a memory block in which data written in the buffer block is finally written.

Figure 2:
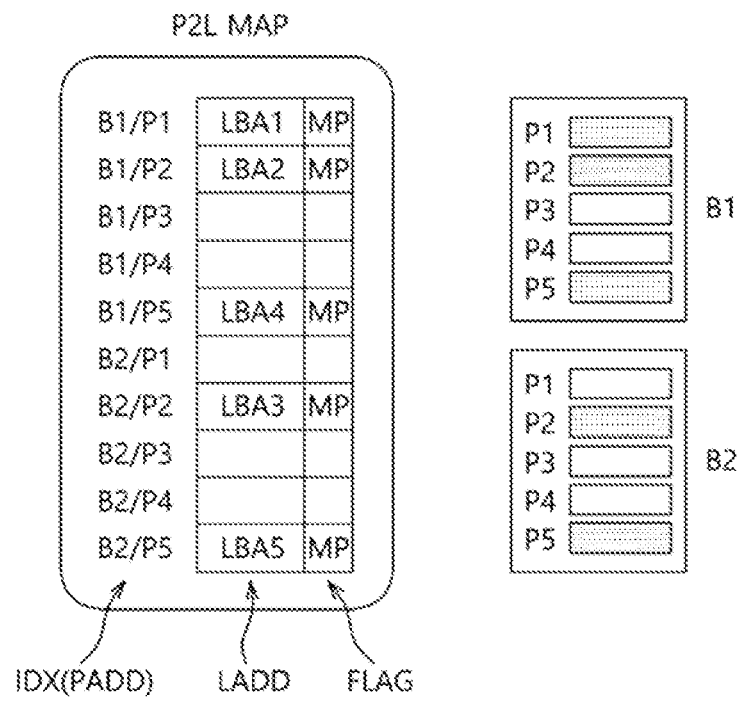
FIG. 2 is a representation of an example of a diagram illustrating a physical-to-logical (P2L) map in accordance with an embodiment.
Figure 3:
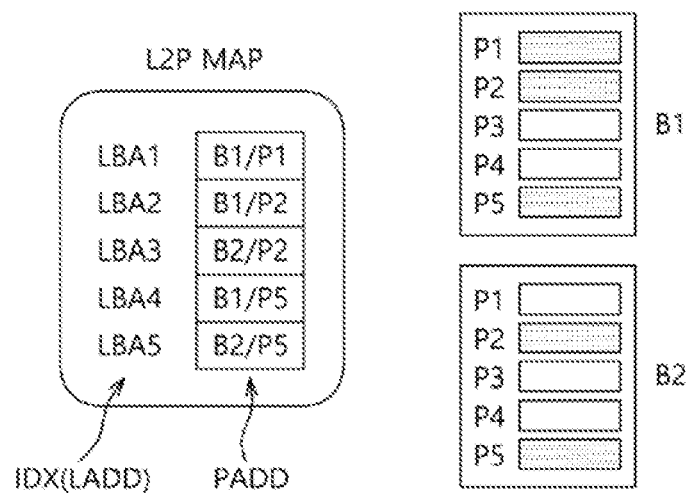
FIG. 3 is a representation of an example of a diagram illustrating a logical-to-physical (L2P) map in accordance with an embodiment.

FIG. 2 is a representation of an example of a diagram illustrating a physical-to-logical (P2L) map in accordance with an embodiment. FIG. 3 is a representation of an example of a diagram illustrating a logical-to-physical (L2P) map in accordance with an embodiment. Memory blocks B1 and B2 each including five pages P1 to P5 are illustrated as an example in FIGS. 2 and 3.

When the host device 400 shown in FIG. 2 accesses the data storage device 100, for example, transmits a request to the data storage device 100, the host device 400 may provide a logical address to the data storage device 100. The data storage device 100 may convert or translate the provided logical address into a physical address of the nonvolatile memory device 300, and process the request of the host device 400 by referring to the converted physical address.

For such an address converting operation, the data storage device 100 may generate and manage address mapping information, that is, an address map. The address map may include the P2L map shown in FIG. 2 and the L2P map shown in FIG. 3.

Referring to FIG. 2, the P2L map may be generated based on a physical address. That is, the P2L map may be generated by using a physical address PADD as an index IDX. The P2L map may include information on a logical address LADD corresponding to the index IDX.

Also, the P2L map may include flag information FLAG corresponding to the logical address LADD. The flag information FLAG may indicate whether or not there is an unmap request for the corresponding logical address LADD. That is, the flag information FLAG may indicate whether the corresponding logical address LADD is mapped or unmapped. For instance, the flag information FLAG which is flagged as mapping MP may mean that the corresponding logical address LADD is mapped. For another instance, the flag information FLAG which is flagged as unmapping UNM may mean that the corresponding logical address LADD is unmapped.

Referring to FIG. 3, the L2P map may be generated based on a logical address. Namely, the L2P map may be generated by using a logical address LADD as an index IDX, for example, a logical block address 1 (LBA1) to LBA5. The L2P map may include information on a physical address PADD corresponding to the index IDX.

Referring to FIGS. 2 and 3, the P2L map and the L2P map may have the same address mapping information. That is, address mapping information obtained by referring to the P2L map and address mapping information obtained by referring to the L2P map may be the same as each other. For matching of the P2L map and the L2P map, the L2P map may be updated based on the P2L map.

Figure 4:
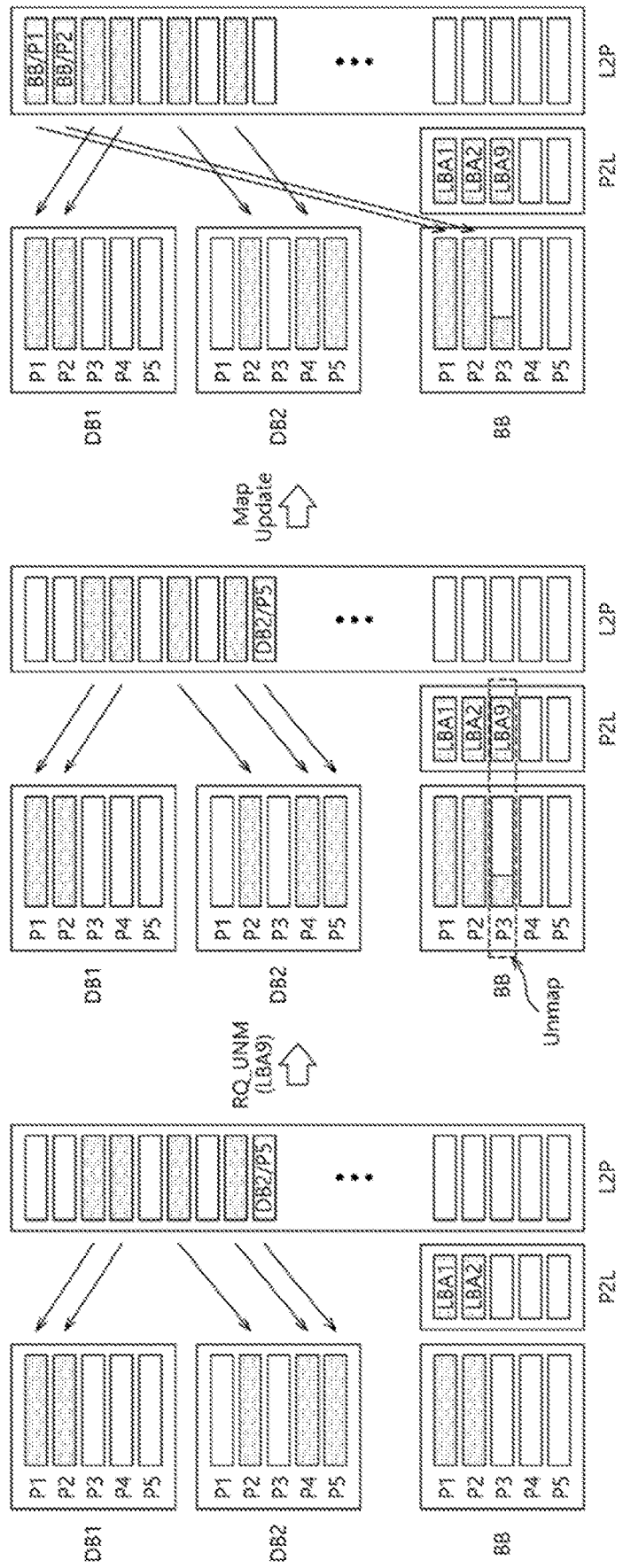
FIG. 4 is a representation of an example of a diagram illustrating an operation of a data storage device which processes an unmap request of a host device in accordance with an embodiment.
Figure 5:
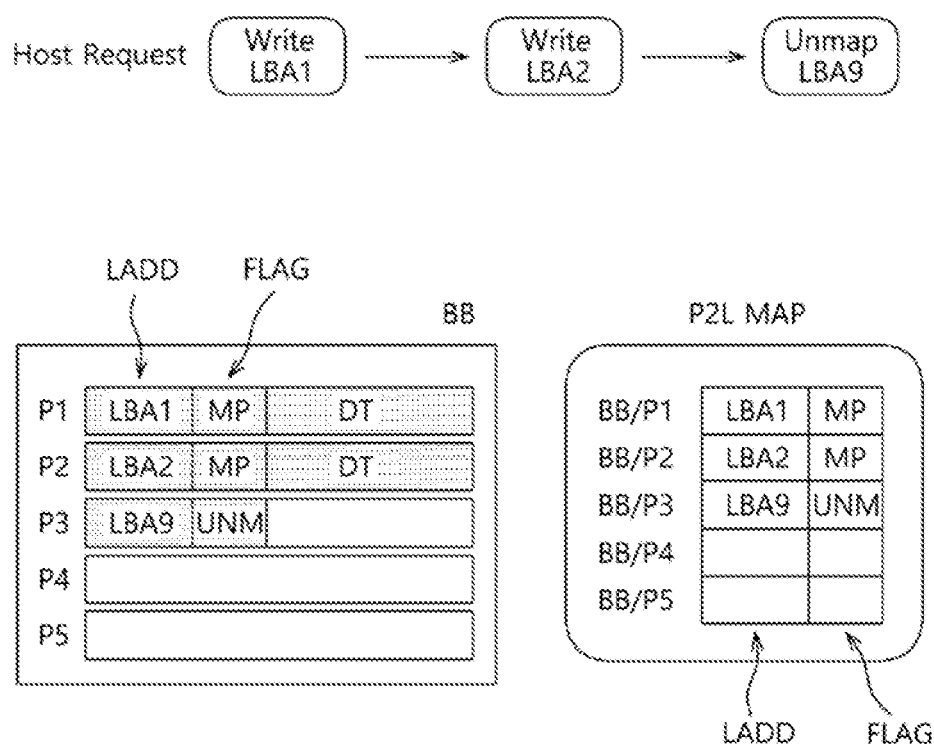
FIG. 5 is a representation of an example of a diagram illustrating a process in which a buffer block and a physical-to-logical (P2L) map are changed while an unmap request of a host device is processed, in accordance with an embodiment.

FIG. 4 is a representation of an example of a diagram illustrating an operation of a data storage 100 device which processes an unmap request of the host device 400 in accordance with an embodiment. FIG. 5 is a representation of an example of a diagram illustrating a process in which a buffer block and a physical-to-logical (P2L) map are changed while an unmap request of a host device 400 is processed, in accordance with an embodiment. The data storage device 100 including a buffer block BB and data blocks DB1 and DB2 each of which includes five pages P1 to P5, is illustrated as an example.

The host device 400 may request the data storage device 100 to erase a certain logical address or a physical address mapped to a certain logical address. To this end, the host device 400 may transmit an unmap request to the data storage device 100. The unmap request may include an unmap command and a logical address to be unmapped, hereinafter, referred to as an unmap address. The data storage device 100 may unmap the unmap address in the address map, that is, the P2L map and the L2P map according to the unmap request.

Since the operation of updating the address map for matching of the P2L map and the L2P map may include an operation of comparing the P2L map and the L2P map, an operation of flushing or backing up the L2P map in the nonvolatile memory device 300 and an operation of updating meta information for managing the L2P map, such as position information of the L2P map, a large amount of resources may be consumed, and a long time may be required.

Therefore, the data storage device 100 may process stepwise the unmap request of the host device 400 by being divided into primary unmap processing and secondary unmap processing. That is, the data storage device 100 may unmap the unmap address preferentially in the P2L map. Then, the data storage device 100 may unmap the unmap address finally in the L2P map at a point of time when update of the L2P map is necessary.

As shown in FIGS. 4 and 5, as an example, a state in which, according to a write request of the host device 400, a ninth logical address LBA9 is mapped to the fifth page P5 of the second data block DB2, and the L2P map is generated is described. Further, as an example, a state in which a first logical address LBA1 is mapped to the first page P1 of the buffer block BB, a second logical address LBA2 is mapped to the second page P2 of the buffer block BB, and the P2L map is generated is described. In these states, if an unmap request RQ_UNM for the ninth logical address LBA9 is received from the host device 400, the ninth logical address LBA9 may be unmapped preferentially in the P2L map.

For example, referring to FIG. 5, the unmap address LBA9 and the flag information FLAG which is flagged as unmapping UNM may be stored in an empty page P3 of the buffer block BB. Even though data DT are not written, the unmap address LBA9 may be mapped to and written in the third page P3 of the buffer block BB, similar to the write-requested logical addresses LBA1 and LBA2.

After unmapping of the unmap address LBA9 is written in the buffer block BB, the unmap address LBA9 may be unmapped in the P2L map. Namely, the unmap address LBA9 may be mapped and the flag information FLAG may be flagged as unmapping UNM to indicate that the unmap address LBA9 is unmapped, in the P2L map in correspondence to the third page P3 of the buffer block BB.

The P2L map may be loaded in the random access memory 230, and be referred to by the control unit 220. If power is off, the P2L map loaded in the random access memory 230 may be lost. To prevent the P2L map from being lost due to an abnormal power-off such as a sudden power-off, the unmap address LBA9 may be written in both the buffer block BB and the P2L map, and, when recovery is made from a sudden power-off, the unmap address LBA9 may be rebuilt by referring to the buffer block BB.

Referring again to FIG. 4, after the unmap address LBA9 is unmapped preferentially in the P2L map, at a point of time when update of the L2P map is necessary, the unmap address LBA9 may be unmapped finally in the L2P map. The point of time when update of the L2P map is necessary may mean a point of time at which a periodic address map update operation for matching the P2L map and the L2P map is performed. The point of time when update of the L2P map is necessary may mean a point of time at which mapping of the buffer block BB by requests of the host device 400 is completed, that is, a point of time at which all pages of the buffer block BB are written. Alternatively, the point of time when update of the L2P map is necessary may mean when the data storage device 100 is recovered from a sudden power-off.

If the L2P map is updated by reflecting the P2L map, the unmap address LBA9 mapped to the fifth page P5 of the second data block DB2 may be erased from the L2P map. For example, if the L2P map is updated, information of a physical address DB2/P5 mapped to the unmap address LBA9 may be erased from the L2P map.

Figure 6:
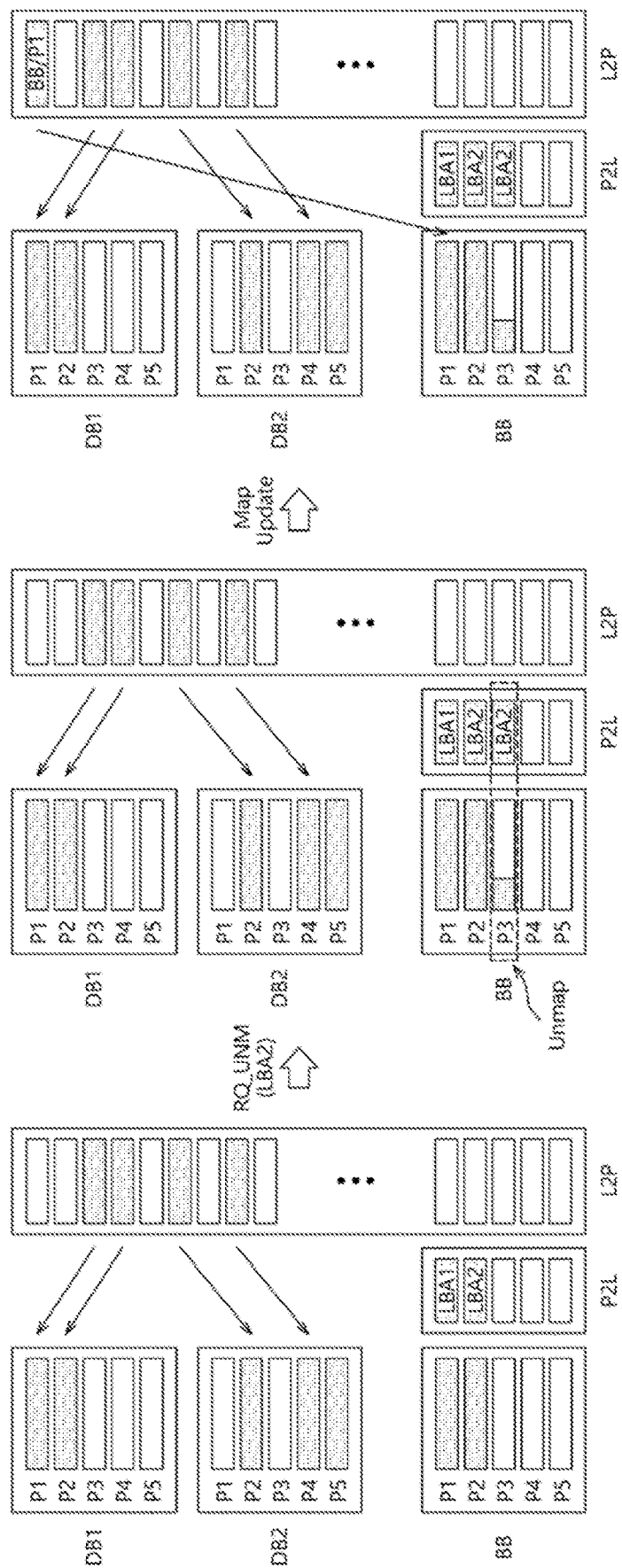
FIG. 6 is a representation of an example of a diagram illustrating an operation of a data storage device which processes an unmap request of a host device in accordance with an embodiment.
Figure 7:
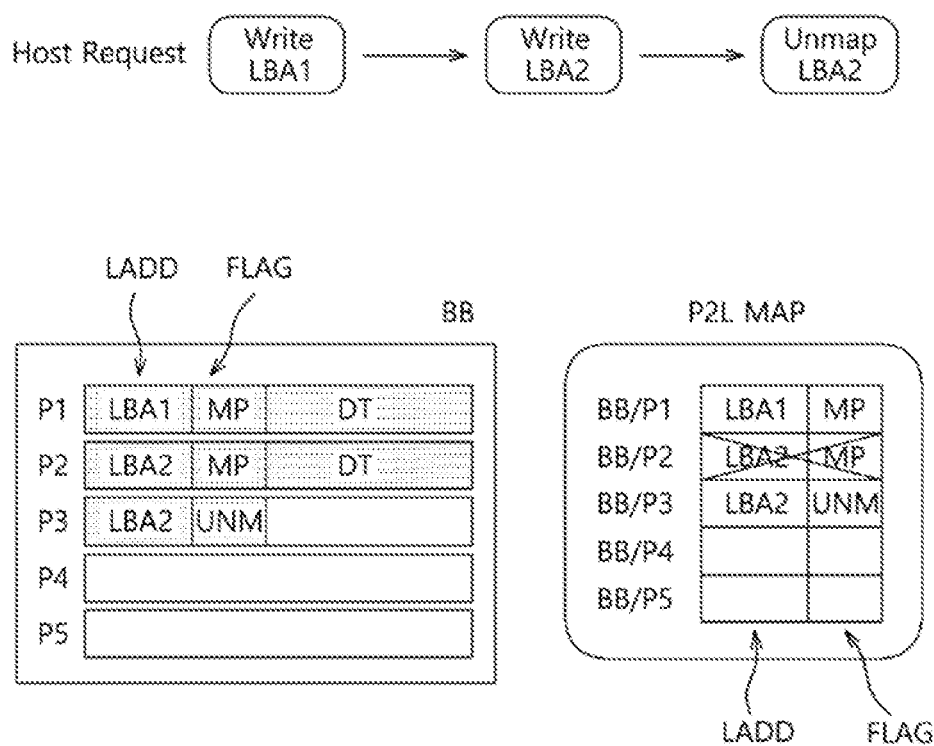
FIG. 7 is a representation of an example of a diagram illustrating a process in which a buffer block and a physical-to-logical (P2L) map are changed while an unmap request of a host device is processed, in accordance with an embodiment.

FIG. 6 is a representation of an example of a diagram illustrating an operation of a data storage device 100 which processes an unmap request of a host device 400 in accordance with an embodiment. FIG. 7 is a representation of an example of a diagram illustrating a process in which a buffer block and a physical-to-logical (P2L) map are changed while an unmap request of a host device is processed, in accordance with an embodiment. The data storage device 100 including a buffer block BB and data blocks DB1 and DB2 each of which includes five pages P1 to P5 is illustrated as an example.

As shown in FIGS. 6 and 7, a state in which, according to write requests of the host device 400, a first logical address LBA1 is mapped to the first page P1 of the buffer block BB, a second logical address LBA2 is mapped to the second page P2 of the buffer block BB, and the P2L map is generated is described as an example. In these states, if an unmap request RQ_UNM for the second logical address LBA2 is received from the host device 400, the second logical address LBA2 may be unmapped preferentially in the P2L map.

For example, referring to FIG. 7, the unmap address LBA2 and the flag information FLAG which is flagged as unmapping UNM may be stored in an empty page P3 of the buffer block BB. Even though data DT are not written, the unmap address LBA2 may be mapped to and written in the third page P3 of the buffer block BB, like the write-requested logical address LBA1.

After unmapping of the unmap address LBA2 is written in the buffer block BB, the unmap address LBA2 may be unmapped in the P2L map. Namely, the unmap address LBA2 may be mapped and the flag information FLAG may be flagged as unmapping UNM to indicate that the unmap address LBA2 is unmapped, in the P2L map in correspondence to the third page P3 of the buffer block BB. In this case, to ensure that the second page P2 of the buffer block BB which is previously mapped to the unmap address LBA2 is not referred to, the mapping information of the unmap address LBA2 which is mapped before the unmap request is invalidated.

Referring again to FIG. 6, after the unmap address LBA2 is unmapped preferentially in the P2L map, at a point of time when update of the L2P map is necessary, the unmap address LBA2 may be unmapped finally in the L2P map. Since the unmap address LBA2 had been mapped by only the P2L map, only the first logical address LBA1 is updated in the L2P map.

Before the L2P map is updated, a read request or a write request for an unmap address may be received from the host device 400. In this case, a request processing method of the data storage device 100 will be described below with reference to FIGS. 8 to 10.

Figure 8:
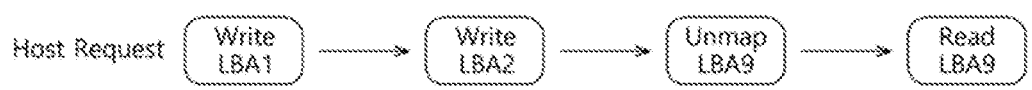
FIG. 8 is a representation of an example of a diagram illustrating a method for processing a read request for an unmap address unmapped in a physical-to-logical (P2L) map, in accordance with an embodiment.
Figure 8:
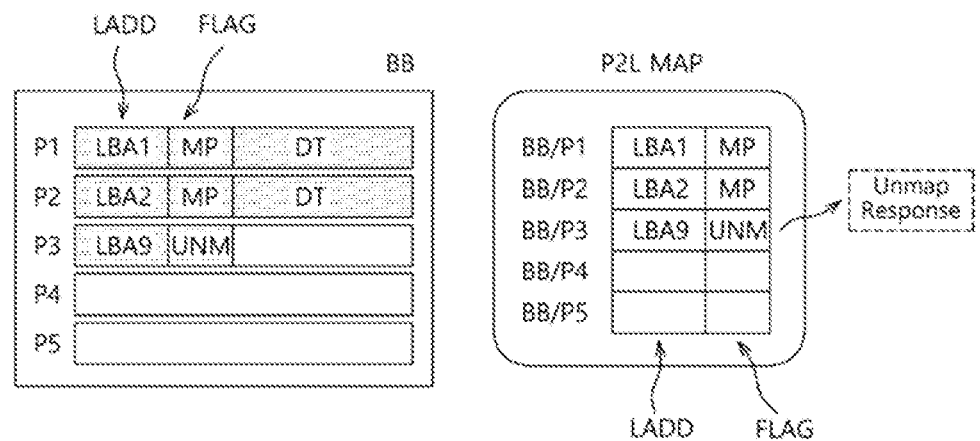

FIG. 8 is a representation of an example of a diagram illustrating a method for processing a read request for an unmap address unmapped in a physical-to-logical (P2L) map, in accordance with an embodiment. As an example, the host device 400 transmits a read request for the unmap address LBA9 which is described above with reference to FIG. 5.

When a read request for the logical address LBA9 is received from the host device 400, the data storage device 100 may search whether the logical address LBA9 is hit in the P2L map. If it is determined by referring to the flag information FLAG that the logical address LBA9 is unmapped, the data storage device 100 may transmit an unmap response. For example, the data storage device 100 may transmit data having a specific pattern of agreement with the host device 400 to the host device 400 as an unmap response. For another example, the data storage device 100 may transmit an unmap response notifying that the read-requested logical address LBA9 is in an unmapped state, to the host device 400.

Figure 9:
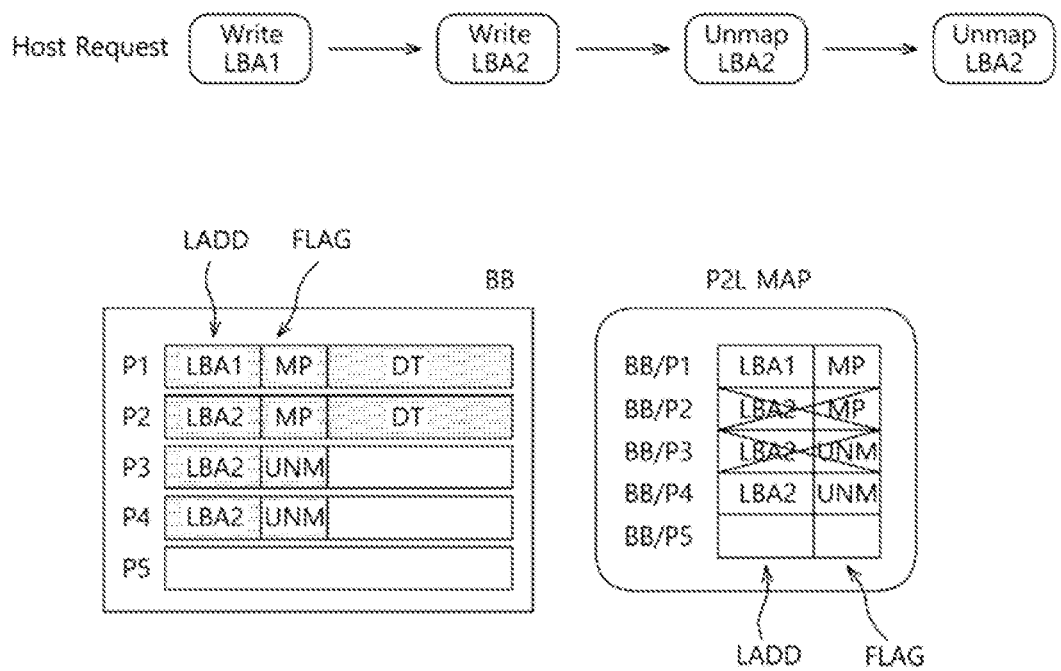
FIG. 9 is a representation of an example of a diagram illustrating a method for processing again an unmap request for an unmap address unmapped in a physical-to-logical (P2L) map, in accordance with an embodiment.

FIG. 9 is a representation of an example of a diagram illustrating a method for processing an unmap request for an unmap address unmapped in a physical-to-logical (P2L) map, in accordance with an embodiment. As an example, the host device 400 transmits an unmap request for the unmap address LBA2 which is described above with reference to FIG. 7.

When an unmap request for the logical address LBA2 which has been unmapped already is received again from the host device 400, the unmap address LBA2 and the flag information FLAG which is flagged as unmapping UNM may be stored in an empty page P4 of the buffer block BB. Even though data DT are not written, the unmap address LBA2 may be mapped to and written in the fourth page P4 of the buffer block BB, similar to the write-requested logical address LBA1.

After unmapping of the unmap address LBA2 is written in the buffer block BB, the unmap address LBA2 may be unmapped in the P2L map. Namely, the unmap address LBA2 may be mapped and the flag information FLAG may be flagged as unmapping UNM to indicate that the unmap address LBA2 is unmapped, in the P2L map in correspondence to the fourth page P4 of the buffer block BB. In this case, all the mapping information of the unmap address LBA2 which was mapped before the current unmap request is invalidated.

Figure 10:
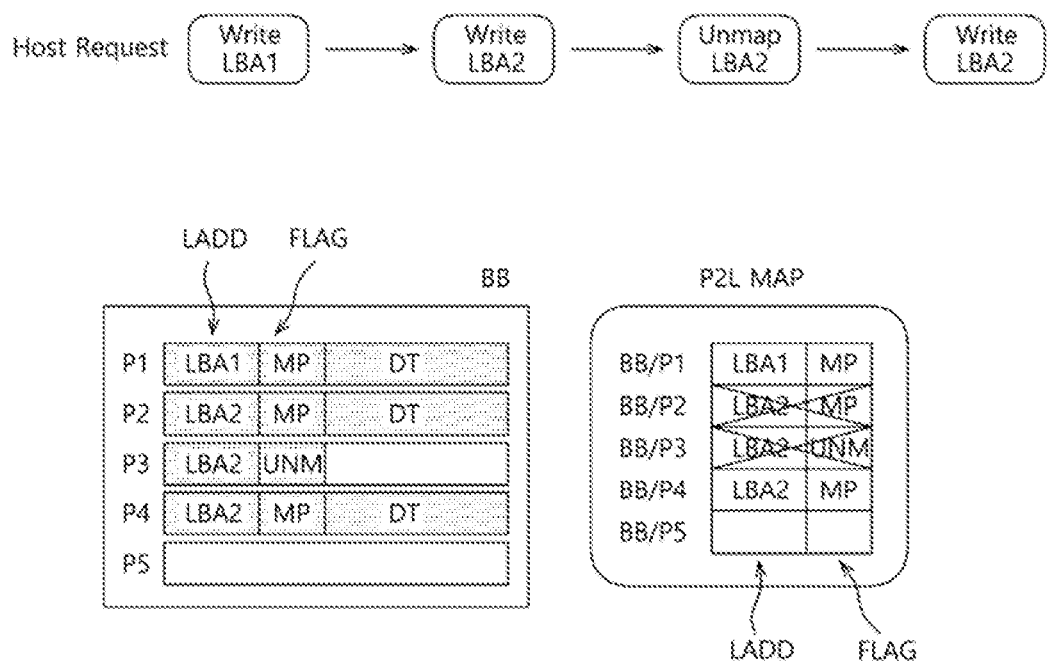
FIG. 10 is a representation of an example of a diagram illustrating a method for processing a write request for an unmap address unmapped in a physical-to-logical (P2L) map, in accordance with an embodiment.

FIG. 10 is a representation of an example of a diagram illustrating a method for processing a write request for an unmap address unmapped in a physical-to-logical (P2L) map, in accordance with an embodiment. As an example, the host device 400 transmits a write request for the unmap address LBA2 which is described above with reference to FIG. 7.

When a write request for the logical address LBA2 which has been unmapped already is received from the host device 400, the write-requested second logical address LBA2, the flag information FLAG which is flagged as mapping MP and write-requested data DT may be stored in an empty page, that is, the fourth page P4, of the buffer block BB.

After the new mapping information and the data are stored in the buffer block BB, the second logical address LBA2 may be mapped in the P2L map. That is, the second logical address LBA2 may be mapped and the flag information FLAG for indicating that the second logical address LBA2 was not unmapped may be flagged, in the P2L map in correspondence to the fourth page P4 of the buffer block BB. In this case, all the mapping information of the second logical address LBA2 which was mapped before the current write request is invalidated.

Figure 11:
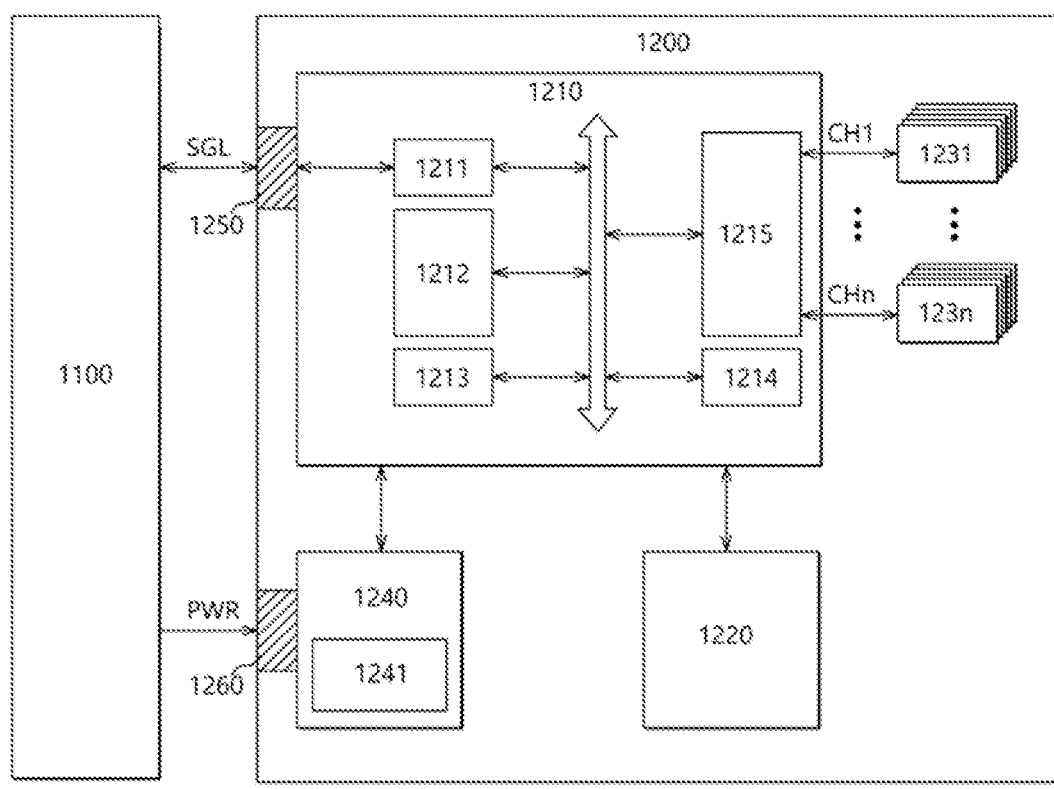
FIG. 11 is a diagram illustrating a representation of an example of a data processing system including a solid state drive in accordance with an embodiment.

FIG. 11 is a diagram illustrating a representation of an example of a data processing system 1000 including a solid state drive (SSD) in accordance with an embodiment. Referring to FIG. 11, the data processing system 1000 may include a host device 1100 and the SSD 1200.

The SSD 1200 may include a controller 1210, a buffer memory device 1220, at least one of nonvolatile memory devices 1231 to 123*n*, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123*n*. The generated parity data may be stored together with the data in the nonvolatile memory devices 1231 to 123*n*. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 12:
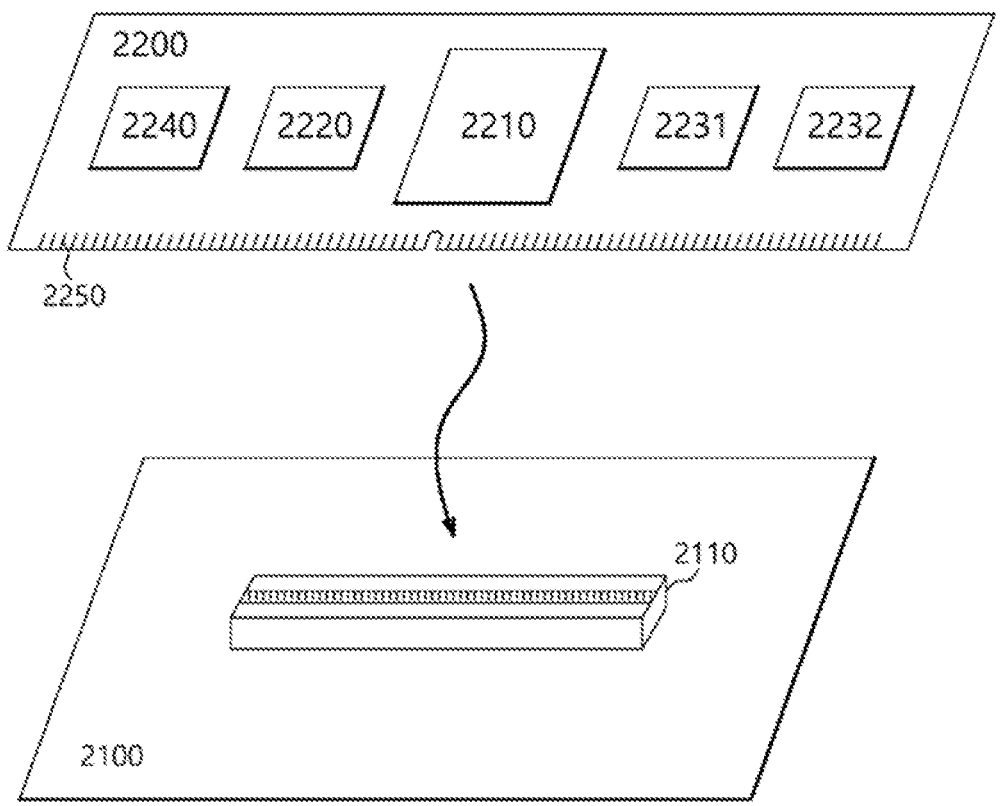
FIG. 12 is a diagram illustrating a representation of an example of a data processing system including a data storage device in accordance with an embodiment.

FIG. 12 is a diagram illustrating a representation of an example of a data processing system 2000 including a data storage device 2200 in accordance with an embodiment. Referring to FIG. 12, the data processing system 2000 may include a host device 2100 and the data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 11.

The buffer memory device 2220 may temporarily store data in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 13:
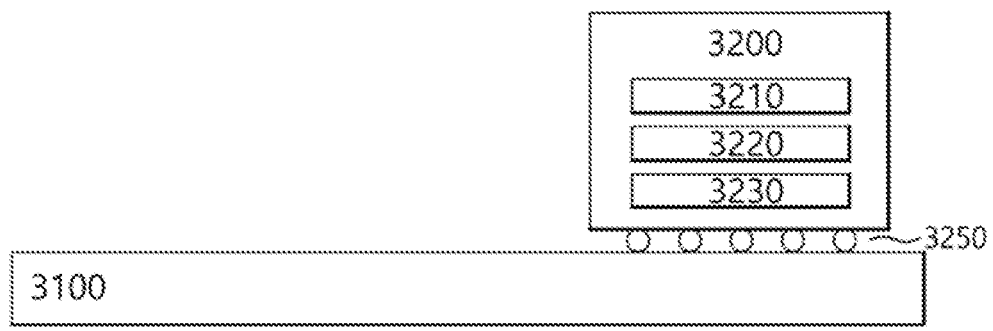
FIG. 13 is a diagram illustrating a representation of an example of a data processing system including a data storage device in accordance with an embodiment.

FIG. 13 is a diagram illustrating a representation of an example of a data processing system 3000 including a data storage device 3200 in accordance with an embodiment. Referring to FIG. 13, the data processing system 3000 may include a host device 3100 and the data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 11.

The buffer memory device 3220 may temporarily store data in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 14:
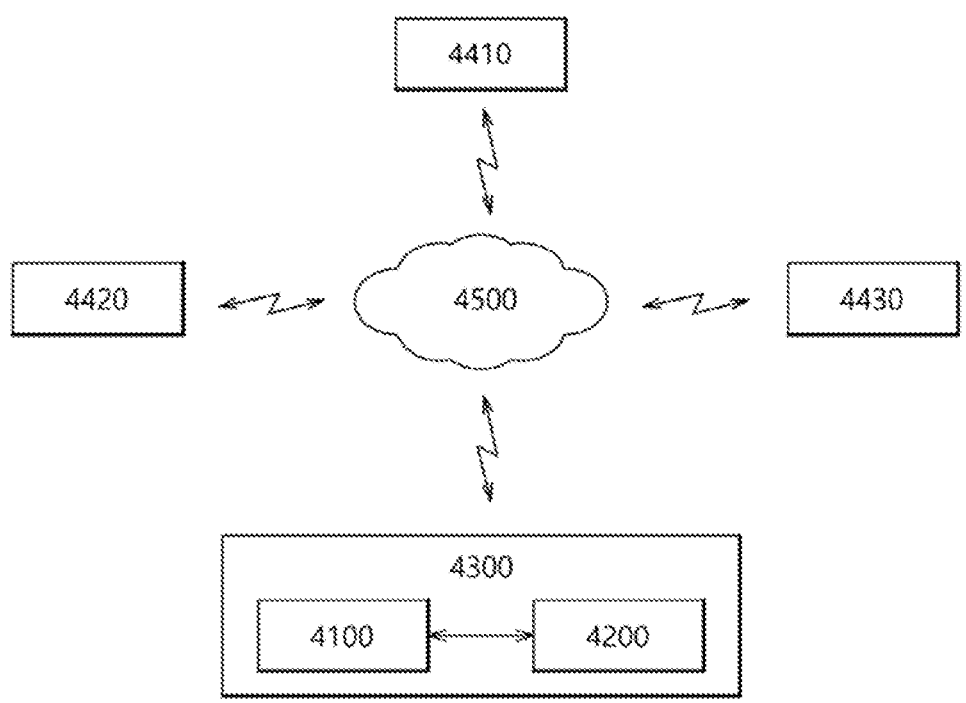
FIG. 14 is a diagram illustrating a representation of an example of a network system including a data storage device in accordance with an embodiment.

FIG. 14 is a diagram illustrating a representation of an example of a network system 4000 including a data storage device in accordance with an embodiment. Referring to FIG. 14, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured as the data storage device 100 shown in FIG. 1, the data storage device 1200 shown in FIG. 11, the data storage device 2200 shown in FIG. 12 or the data storage device 3200 shown in FIG. 13.

Figure 15:
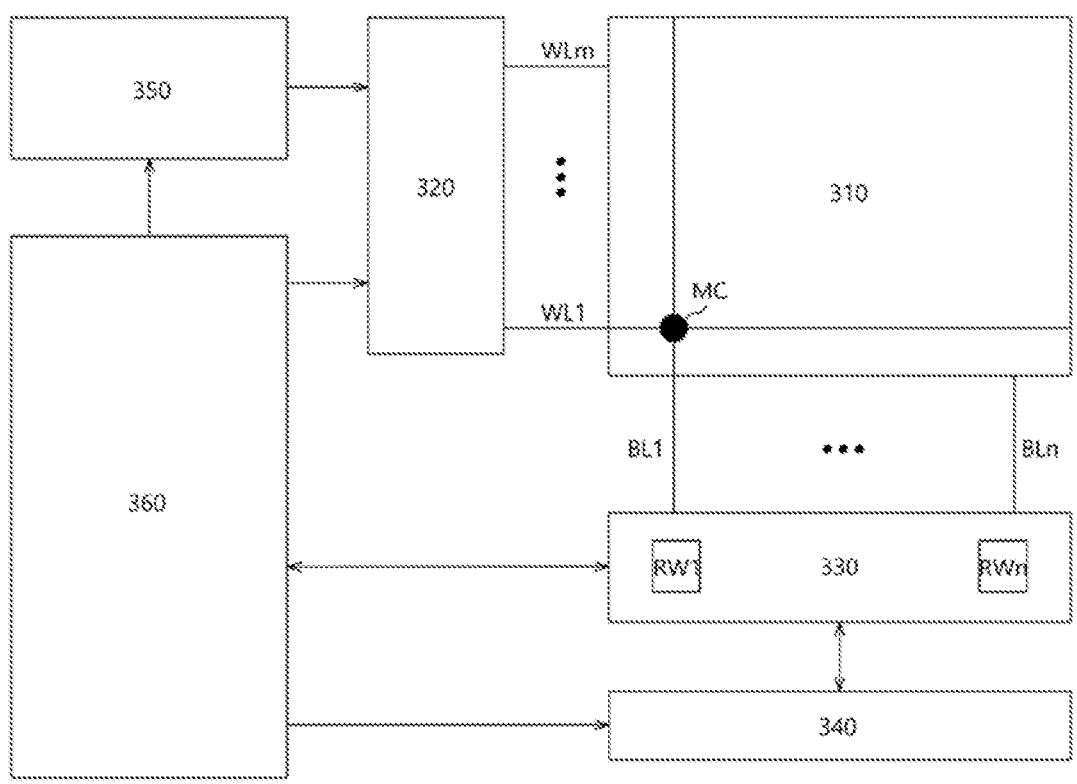
FIG. 15 is a block diagram illustrating a representation of an example of a nonvolatile memory device included in a data storage device in accordance with an embodiment.

FIG. 15 is a block diagram illustrating a representation of an example of a nonvolatile memory device included in a data storage device 300 in accordance with an embodiment. Referring to FIG. 15, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the data storage device and the operating method thereof described herein should not be limited based on the described embodiments.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A method for operating a data storage device which uses a nonvolatile memory device including data memory blocks each of which includes pages and a nonvolatile buffer memory block which temporarily stores data, the method comprising:
receiving an unmap request which requests that an unmap address be erased, from a host device;
periodically storing the unmap address and flag information indicating that the unmap address is unmapped, in a first empty page of the nonvolatile buffer memory block of the nonvolatile memory device; and
mapping the unmap address and flagging flag information indicating that the unmap address is unmapped, in a physical-to-logical (P2L) map of a random access memory corresponding to the first empty page of the nonvolatile buffer memory block,
wherein, when recovery is made from a sudden power-off, the P2L map is rebuilt by referring to the unmap address and the flag information stored in the nonvolatile buffer memory block,
wherein, the unmap address is erased in a logical-to-physical (L2P) map of the nonvolatile memory device, based on the P2L map wherein the P2L map and the L2P map are distinct maps.

2. The method according to claim 1, wherein, when recovery is made from the sudden power-off, the unmap address is erased in the L2P map of the nonvolatile memory device, based on the flag information of the P2L map in the random access memory.

3. The method according to claim 1, wherein, when all pages of the nonvolatile buffer memory block are written, the unmap address is erased in the L2P map of the nonvolatile memory device, based on the flag information of the P2L map in the random access memory.

4. The method according to claim 1, wherein, at a point in time at which a periodic address map update for matching the P2L map in the random access memory and the L2P map in the nonvolatile memory device is performed, the unmap address is erased in the L2P map, based on the flag information of the P2L map.

5. The method according to claim 1, further comprising:
invalidating all mapping information of the unmap address which was mapped before the unmap request, in the P2L map of the random access memory.

6. The method according to claim 1, further comprising:
transmitting, when a read request for the unmap address is received from the host device, an unmap response by referring to the flag information of the P2L map in the random access memory.

7. The method according to claim 6, wherein the transmitting of the unmap response comprises notifying that the read-requested unmap address is in an unmapped state.

8. The method according to claim 1, further comprising:
storing, when an unmap request requesting that the unmap address be erased is received again from the host device, the unmap address and flag information indicating that the unmap address was unmapped, in a second empty page of the nonvolatile buffer memory block; and
mapping the unmap address and flagging flag information indicating that the unmap address was unmapped, in the P2L map of the random access memory corresponding to the second empty page of the nonvolatile buffer memory block.

9. The method according to claim 1, further comprising:
storing, when a write request for the unmap address is received from the host device, a write-requested address, flag information indicating that the write-requested address has not been unmapped and write-requested data, in a second empty page of the nonvolatile buffer memory block; and
mapping the write-requested address and flagging flag information indicating that the write-requested address is mapped, in the P2L map of the random access memory corresponding to the second empty page of the nonvolatile buffer memory block.

10. The method according to claim 9, further comprising:
invalidating all mapping information of the write-requested address which was mapped before the write request, in the P2L map of the random access memory.

11. A data storage device comprising:
a nonvolatile memory device including data memory blocks each of which includes pages and a nonvolatile buffer memory block which stores data temporarily;
a random access memory suitable for storing a physical-to-logical (P2L) map which maps a physical address of the nonvolatile memory device and a logical address provided from a host device; and
a control unit suitable for periodically updating a logical-to-physical (L2P) map based on the P2L map, and flushing the L2P map in the nonvolatile memory device,
wherein, according to an unmap request of the host device which requests that an unmap address be erased, the control unit stores the unmap address and flag information indicating that the unmap address is unmapped, in a first empty page of the nonvolatile buffer memory block of the nonvolatile memory device, and maps the unmap address and flags flag information indicating that the unmap address is unmapped, in the P2L map of a random access memory corresponding to the first empty page of the nonvolatile buffer memory block in which the unmap address is stored,
wherein, when recovery is made from a sudden power-off, the L2P map is rebuilt by referring to the unmap address and the flag information stored in the nonvolatile buffer memory block,
wherein, the unmap address is erased in the L2P map of the nonvolatile memory device, based on the P2L map wherein the P2L map and the L2P map are distinct maps.

12. The data storage device according to claim 11, wherein, when recovery is made from the sudden power-off, the control unit erases the unmap address in the L2P map of the nonvolatile memory device, based on the flag information of the P2L map in the random access memory.

13. The data storage device according to claim 11, wherein, when all pages of the nonvolatile buffer memory block are written, the control unit erases the unmap address in the L2P map of the nonvolatile memory device, based on the flag information of the P2L map in the random access memory.

14. The data storage device according to claim 11, wherein, during a periodic address map update operation for matching the P2L map in the random access memory and the L2P map in the nonvolatile memory device, the control unit erases the unmap address in the L2P map, based on the flag information of the P2L map.

15. The data storage device according to claim 11, wherein the control unit erases a physical address of the L2P map in the nonvolatile memory device which is mapped to the unmap address, according to the unmap request.

16. The data storage device according to claim 11, wherein the control unit invalidates all mapping information of the unmap address which was mapped before the unmap request, in the P2L map of the random access memory.

17. The data storage device according to claim 11, wherein the control unit transmits, when a read request for the unmap address is received from the host device, an unmap response by referring to the flag information of the P2L map in the random access memory.

18. The data storage device according to claim 17, wherein the control unit transmits data having a specific pattern of agreement with the host device, as the unmap response.

19. The data storage device according to claim 11, wherein, when an unmap request which requests that the unmap address be erased is received again from the host device, the control unit stores the unmap address and flag information indicating that the unmap address was unmapped, in a second empty page of the nonvolatile buffer memory block, and maps the unmap address and flags flag information indicating that the unmap address was unmapped, in the P2L map of the random access memory corresponding to the second empty page of the nonvolatile buffer memory block.

20. The data storage device according to claim 11, wherein, when a write request for the unmap address is received from the host device, the control unit stores a write-requested address, flag information indicating that the write-requested address has not been unmapped, and write-requested data in a second empty page of the nonvolatile buffer memory block, and maps the write-requested address and flags flag information indicating that the write-requested address is mapped, in the P2L map of the random access memory corresponding to the second empty page of the nonvolatile buffer memory block.

* * * * *